United States Patent
Doo et al.

(10) Patent No.: US 8,556,443 B2
(45) Date of Patent: Oct. 15, 2013

(54) OPTICAL MEMBER

(75) Inventors: Jun Kil Doo, Yongin-si (KR); Hyung Soo Lee, Yongin-si (KR); Young Shin Kim, Seoul (KR); Mi So Lim, Yongin-si (KR)

(73) Assignee: Kolon Industries, Inc., Gwacheon-Si (KR)

( * ) Notice: Subject to any disclaimer, the term of this patent is extended or adjusted under 35 U.S.C. 154(b) by 108 days.

(21) Appl. No.: 12/810,262

(22) PCT Filed: Dec. 24, 2008

(86) PCT No.: PCT/KR2008/007665
§ 371 (c)(1),
(2), (4) Date: Sep. 20, 2010

(87) PCT Pub. No.: WO2009/082171
PCT Pub. Date: Jul. 2, 2009

(65) Prior Publication Data
US 2011/0026271 A1    Feb. 3, 2011

(30) Foreign Application Priority Data

Dec. 24, 2007 (KR) .................. 10-2007-0136891
Jun. 19, 2008 (KR) .................. 10-2008-0057756
Jun. 24, 2008 (KR) .................. 10-2008-0059737

(51) Int. Cl.
*G09F 13/04* (2006.01)
*G09F 13/08* (2006.01)

(52) U.S. Cl.
USPC .......................................... 362/97.2; 362/619

(58) Field of Classification Search
USPC ............... 362/97.1–97.4, 606, 617–620, 627; 349/62–64; 428/1.5–1.6
See application file for complete search history.

(56) References Cited

U.S. PATENT DOCUMENTS

| | | | |
|---|---|---|---|
| 6,491,397 B2 | 12/2002 | Ogawa et al. | |
| 6,573,950 B1 | 6/2003 | Hirata et al. | |
| 6,643,067 B2 | 11/2003 | Miyamae et al. | |
| 6,906,761 B2 * | 6/2005 | Nakano | 349/65 |
| 7,054,068 B2 * | 5/2006 | Yoshida et al. | 359/624 |
| 2006/0050397 A1 | 3/2006 | Oh et al. | |

FOREIGN PATENT DOCUMENTS

KR    10-2006-0020740 A    3/2006

* cited by examiner

*Primary Examiner* — Jason Moon Han
(74) *Attorney, Agent, or Firm* — Sughrue Mion, PLLC

(57) ABSTRACT

Disclosed is an optical member for use in liquid crystal displays, which can correct the light path and can minimize the loss of light, so that light in a wider angular range can be collected forwards. Even when a distance between the optical member and a light source is shortened, the optical member can exhibit good hiding performance and prevent deformation caused by heat. Upon expansion and shrinkage, the optical member is not scratched and does not generate noise at a portion in contact with a support pin.

21 Claims, 7 Drawing Sheets

(A)

(B)

(A)

(B)

(A)

(B)

(A)

(B)

OPTICAL MEMBER

CROSS REFERENCE TO RELATED APPLICATIONS

This application is a National Stage of International Application No. PCT/KR2008/007665 filed Dec. 24, 2008, claiming priorities based on Korean Patent Application Nos. 10-2007-0136891, filed Dec. 24, 2007, 10-2008-0057756, filed Jun. 19, 2008, and 10-2008-0059737, filed Jun. 24, 2008, the contents of all of which are incorporated herein by reference in their entirety.

TECHNICAL FIELD

The present invention relates to an optical member for use in liquid crystal displays.

BACKGROUND ART

As industrial society has been being partially transformed into an advanced information age, the importance of electronic displays as a medium for displaying and transferring various pieces of information is increasing day by day. Conventionally, a bulky CRT (Cathode Ray Tube) was widely used therefor but faces considerable use limitations as a result of the space required to mount it, thus making it difficult to manufacture CRTs of larger sizes, and accordingly CRTs are being replaced with various types of flat panel displays, including liquid crystal displays (LCDs), plasma display panels (PDPs), field emission displays (FEDs), and organic electroluminescent displays. Among such flat panel displays, LCDs in particular are technologically intensive products resulting from a combination of liquid crystal-semiconductor techniques and are advantageous because they are thin and lightweight and consume little power. Therefore, research and development into structures and manufacturing techniques thereof is continuing. Nowadays, LCDs, which have already been applied to fields such as notebook computers, monitors for desktop computers and portable personal communication devices (PDAs and mobile phones), are being manufactured in larger sizes, and thus it is possible to apply LCDs to large-sized TVs such as HD (High-Definition) TVs. As a result, LCDs are receiving attention as novel displays able to substitute for CRTs, which used to be synonymous with displays.

In LCDs, because the liquid crystals themselves cannot emit light, an additional light source is provided at the back surface thereof so that the intensity of light passing through the liquid crystals in each pixel is controlled to realize contrast. More specifically, the LCD, serving as a device for adjusting light transmittance using the electrical properties of a liquid crystal material, emits light from a light source lamp mounted to the back surface thereof, and the light thus emitted is passed through various functional prism films or sheets to thus cause light to be uniform and directional, after which such controlled light is also passed through a color filter, thereby realizing red, green, and blue (R, G, B) colors. Furthermore, the LCD is of an indirect light emission type, which realizes an image by controlling the contrast of each pixel through electrical methods. As such, a light-emitting device provided with a light source is regarded as important in determining the quality of the image of the LCD, including luminance and uniformity.

Such a light-emitting device is mainly exemplified by a backlight unit (BLU). Typically, light emitted from a plurality of light sources including a cold cathode fluorescent lamp is sequentially passed through a diffusion plate, a diffusion sheet and a prism sheet, and then reaches a liquid crystal panel. The diffusion sheet plays a role in realizing uniform light intensity over the entire front surface of a screen and simultaneously performs a hiding function so that a device such as the light source mounted under the diffusion sheet is not visible from the front surface. The prism sheet functions to control the light path so that light rays directed in various directions having passed through the diffusion sheet are transformed within a range of viewing angles $\theta$ suitable for enabling the image to be viewed by an observer.

In the course of diffusing the light emitted from the light sources using the diffusion sheet and collecting such diffused light using the prism sheet, however, it is possible to collect only the light which is incident within a predetermined angular range. Thus, as part of the light which is not collected is reflected back from the prism sheet or generates sidelobes, the loss of light occurs, undesirably resulting in reduced luminance.

Also, an LCD is recently manufactured to be lightweight and slim and have low power consumption in order to satisfy the demands of consumers. One method of manufacturing an LCD to be slim includes reducing the thickness of the BLU which is an essential element of the LCD. However, the BLU includes a plurality of sheets for increasing the efficiency of light so that light reaches the liquid crystal panel and thus inevitably has a certain degree of thickness. Accordingly, limitations are imposed on reducing the thickness of the LCD to below a predetermined level. Moreover, when the distance between the light source and the sheet is shortened to decrease the thickness of the BLU, hiding performance is reduced. Further, deformation of the sheet may be caused by extended exposure to heat. Hence, attempts to decrease the number of sheets which are mounted in the BLU have been made, but the degree of reduction of the thickness of the BLU thereby has not been large.

On the other hand, support pins are provided between the plurality of light sources to hold the diffusion plate disposed on the light sources. In the case where the light sources are in an on-state for a long period of time and then turned off or are maintained in an off-state and then turned on, the diffusion plate may expand and then shrink or may expand too quickly, due to the change in temperature. If so, the support pins used for holding the light sources may be pulled by the change in the diffusion plate, undesirably causing problems in which the diffusion plate is scratched or noise occurs. In particular, when the distance between the light source and the diffusion plate is shortened to reduce the thickness of the BLU in order to manufacture a slim LCD in accordance with the demands of consumers, the diffusion plate is greatly affected by the change in temperature depending on the state of the light source. In this case, as the distance between the support pin and the diffusion plate is also shortened, the probability of generating friction or noise due to the change in temperature may be further increased.

Hence, there is a need for the development of a member which minimizes the loss of light, enables light rays in the wider angular range to be collected forwards to efficiently increase luminance, exhibits high heat resistance while realizing hiding performance after reducing a distance between a light source and a sheet equal to or higher than hiding performance before reducing a distance between a light source and a sheet, and prevents problems from occurring as a result of friction between a diffusion plate and a support pin attributable to expansion and shrinkage of the diffusion plate.

DISCLOSURE

Technical Problem

Accordingly, the present invention provides an optical member which corrects the light path and minimizes the loss of light, and thus enables light rays in the wider angular range to be collected forwards.

The present invention provides an optical member which exhibits good hiding performance even when spaced apart from a light source by a shortened distance.

The present invention provides an optical member which is not deformed by heat even when spaced apart from a light source by a shortened distance.

The present invention provides an optical member in which, even when the optical member expands and shrinks, it does not generate scratches nor noise at a portion in contact with a support pin.

Technical Solution

A first preferred embodiment of the present invention provides an optical member, composed of a substrate layer and a structural layer formed on one surface or both surfaces of the substrate layer and having an array of a plurality of three-dimensional (3D) structures, wherein each of the 3D structures of the structural layer includes, when viewed in longitudinal cross-section, a first zone having a predetermined curvature k in both directions from a peak thereof, as represented by Equation 1 below in an x-axis and y-axis coordinate system in which the peak is set to an origin of the system, and two second zones abutting on both sides of the first zone and having an inclination angle relative to the substrate layer.

$$k = \frac{-2y}{x^2} \qquad \text{Equation 1}$$

(wherein x is a real number other than 0, and y and k are real numbers).

In the embodiment, each of the second zones may be an inclination angle of 30~50° or 130~150° relative to the substrate layer.

In the embodiment, the first zone may have a curvature k of 0.05~0.30.

In the embodiment, each of the 3D structures of the structural layer may have a pitch of 100~500 μm and a height of 25~300 μm.

In the embodiment, the first zone may have, when viewed in longitudinal cross-section, a base length in contact with the substrate layer, amounting to 1/3~3/5 of the pitch.

In the embodiment, each of the 3D structures of the structural layer may have a longitudinal cross-section which is symmetrical with respect to a vertical centerline passing through a peak point thereof.

In the embodiment, the substrate layer may have irregularities and a surface roughness Ra of 2~40 μm.

In the embodiment, when the structural layer is formed on one surface of the substrate layer, the optical member may further include one or more selected from among a bottom layer formed on a surface of the substrate layer opposite the surface having the structural layer; and a top layer formed on a surface of the structural layer opposite the surface having the substrate layer.

In the embodiment, one or more selected from the bottom layer and the top layer may have irregularities and a surface roughness Ra of 2~40 μm.

In the embodiment, one or more selected from the bottom layer and the top layer may have a thickness of 10~300 μm.

In the embodiment, one or more selected from the bottom layer and the top layer may include particles which are used in an amount of 0.01~40 parts by weight based on 100 parts by weight of a resin for the bottom layer or the top layer.

In the embodiment, the optical member may further include a slip layer formed on one or more surfaces selected from among an uppermost surface of the optical member and a lowermost surface of the optical member and having a surface friction coefficient of 0.25 or less and a thickness of 1~300 μm.

The optical member according to the embodiment may have a hole having a depth of 15 μm or less after a vibration test, in which the depth of the hole is measured by mounting the optical member to a BLU for a liquid crystal display panel, fixing the optical member to a vibration tester, performing the vibration test under conditions of 10 min at 10 Hz and 20 min at 60 Hz thus forming the hole in a lower surface of the optical member at a position which is identical to that of a support pin located at a center of the BLU, measuring a height deviation Z between a highest portion of the hole and a lowest portion of the hole using a laser scanning microscope, performing the measurement three times at the above position, and determining an average value of three measurements.

In the embodiment, the substrate layer and the structural layer may be formed by co-extruding a base resin for the substrate layer and the structural layer while passing through a pattern roller.

In the embodiment, the substrate layer, the structural layer and the slip layer may be formed by co-extruding a base resin for the substrate layer and the structural layer and a resin for the slip layer while passing through a pattern roller.

In the embodiment, the base resin may be selected from among a resin mixture of polycarbonate and polystyrene mixed at a weight ratio of 1:9~9:1, a polycarbonate resin, a polystyrene resin, a methylmethacrylate resin, a styrene-acrylic copolymer resin, and an olefin resin.

In the embodiment, the resin for the slip layer may be selected from among a fluorine resin, a styrene-butadiene copolymer, wax and rubber.

In the embodiment, the resin for the slip layer may be a styrene-butadiene copolymer and may include one or more selected from among fluorine resin particles, styrene-butadiene copolymer particles, wax particles and rubber particles.

In the embodiment, the substrate layer may be formed of any material selected from among a polyethyleneterephthalate resin, a polymethylmethacrylate resin, a polycarbonate resin, a polypropylene resin, a polyethylene resin, a polystyrene resin and a styrene-acrylic copolymer resin, and the structural layer may be formed of any material selected from among a polymer resin group including a UV curable resin and a thermosetting resin.

In the embodiment, the optical member may be subjected to antistatic treatment.

In the embodiment, the optical member may have a total light transmittance of 90% or more and a haze of 90% or more.

The optical member according to the embodiment may have a Weber fraction of 1.0 or less, as represented by Equation 2 below.

$$\text{Weber Fraction (\%)} = \frac{Lumi \cdot (\max) - Lumi \cdot (\min)}{Lumi \cdot (\max)} \times 100 \quad \text{Equation 2}$$

(wherein Lumi. is luminance).

A second preferred embodiment of the present invention provides a BLU assembly, composed of the above optical member; and at least one selected from among a prism sheet and a light diffusion plate.

In the BLU assembly according to the above embodiment, the optical member may be spaced apart from a light source by a distance of 2~10 mm.

Advantageous Effects

According to the present invention, the optical member can correct the light path and can minimize the loss of light, whereby light rays in the wider angular range can be collected forwards.

According to the present invention, the optical member can efficiently increase luminance.

According to the present invention, the optical member can exhibit good hiding performance and is not deformed by heat even when spaced apart from a light source by a shortened distance.

According to the present invention, even when the optical member expands and shrinks, it does not generate scratches nor noise at a portion in contact with a support pin.

DESCRIPTION OF THE REFERENCE NUMERALS IN THE DRAWING

| | |
|---|---|
| 1: second zone | 2: first zone |
| 5: slip layer | 10: substrate layer |
| 20: structural layer | 30: bottom layer |
| 35: particles | 40: top layer |
| 45: particles | 50: light source |
| 60: support pin | 100: optical member |
| 200: prism sheet | |

Best Mode

Hereinafter, a detailed description will be given of the present invention with reference to the appended drawings.

Figure 1:
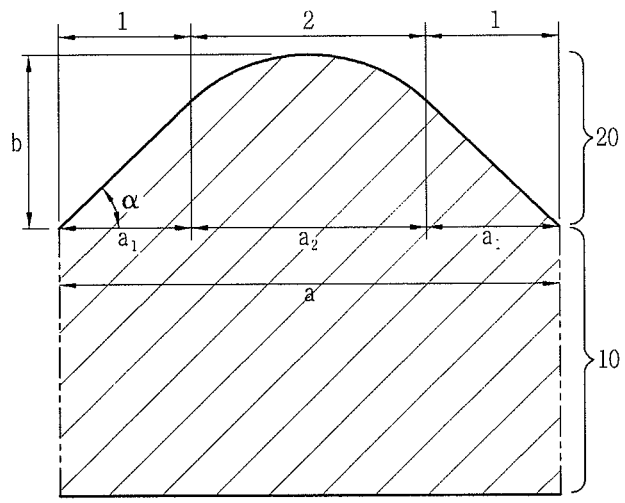
FIG. 1 is of longitudinal cross-sectional views showing an optical member according to a preferred embodiment of the present invention.
Figure 1:
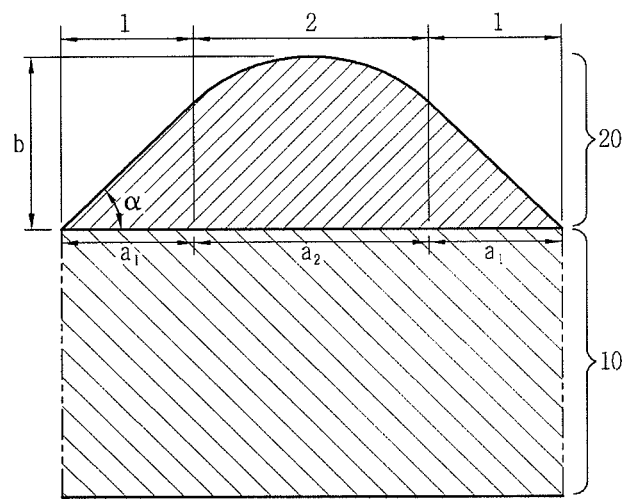
Figure 2:
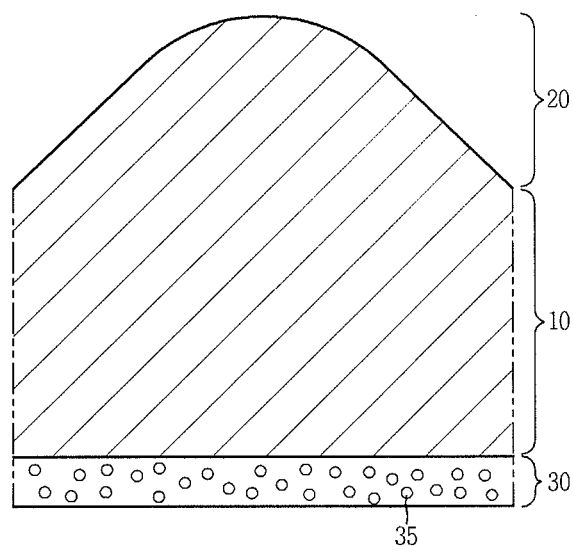
FIGS. 2 to 6 are longitudinal cross-sectional views showing an optical member according to the other preferred embodiments of the present invention.
Figure 2:
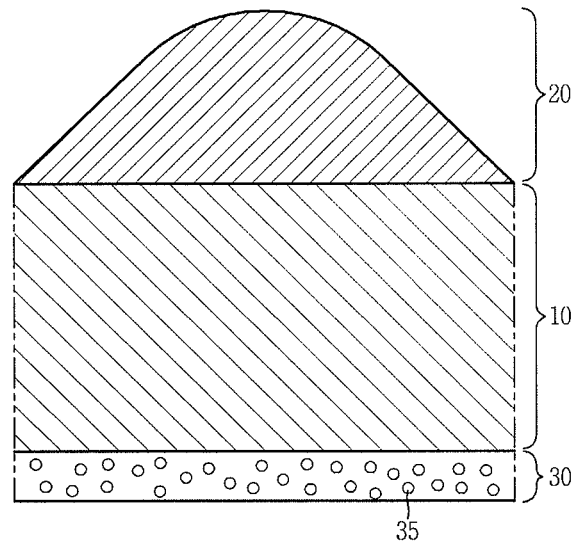
Figure 3:
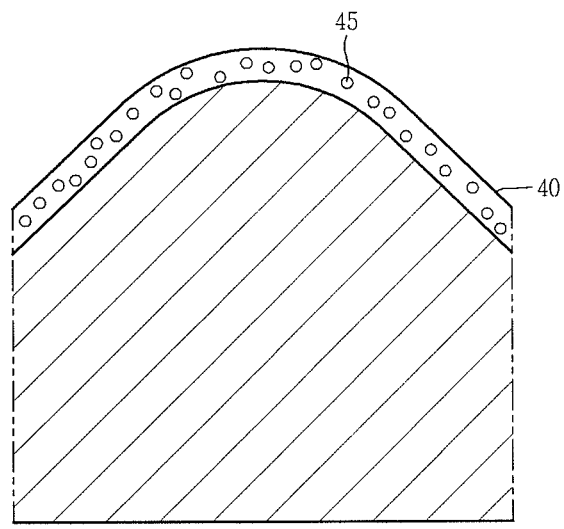
Figure 3:
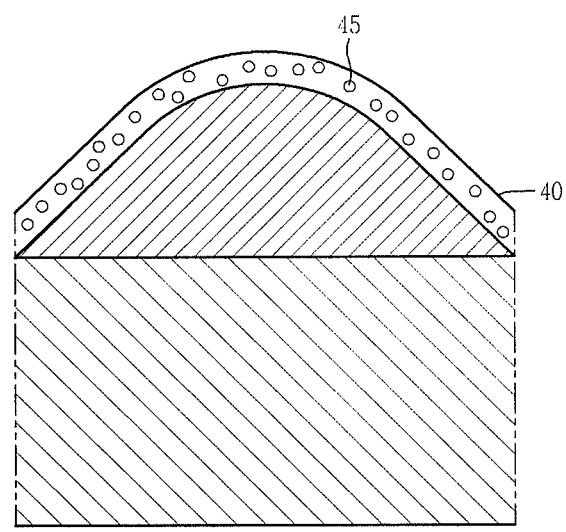
Figure 4:
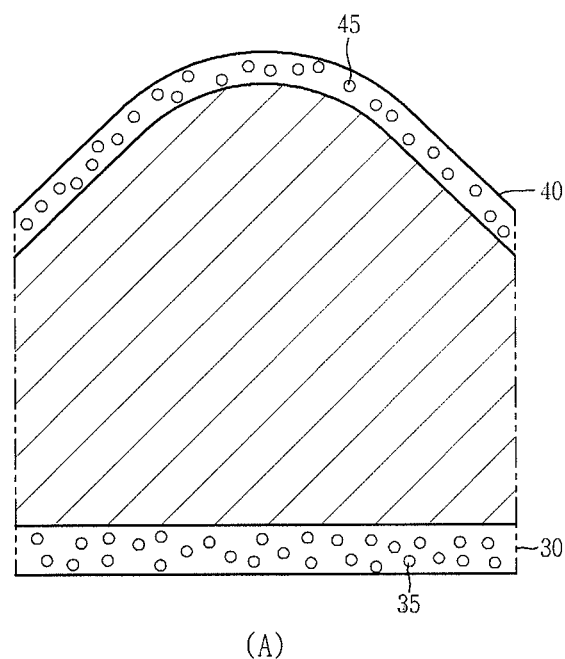
Figure 4:
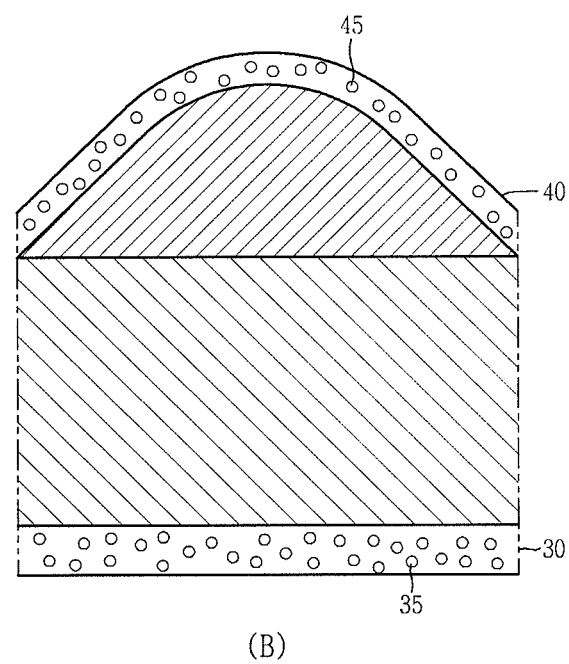
Figure 10:
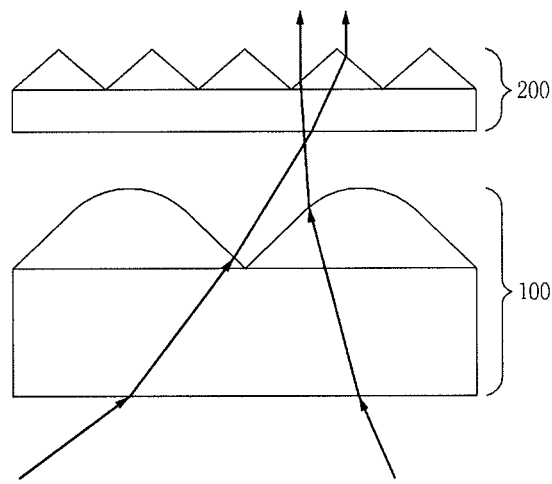
FIG. 10 is a cross-sectional view showing the light path when a prism sheet is disposed on the optical member according to the preferred embodiment of the present invention.
Figure 11:
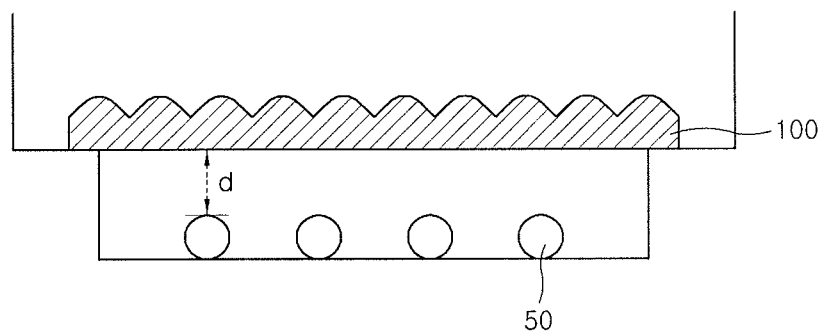
FIGS. 11 and 12 are longitudinal cross-sectional views showing the state in which the optical member according to the other preferred embodiments of the present invention is disposed on light sources.
Figure 12:
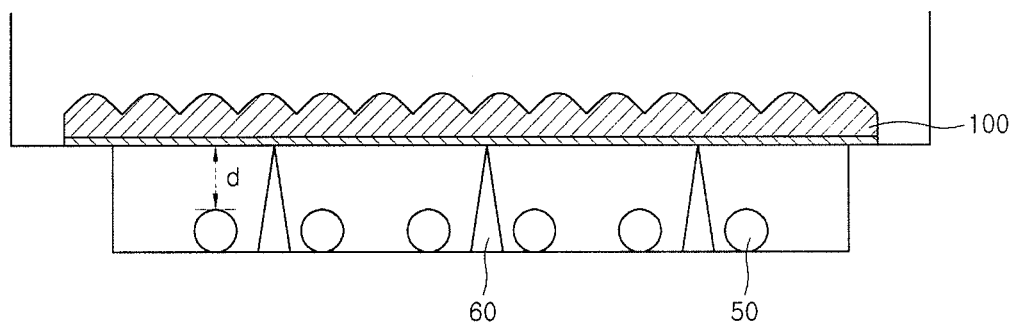

FIG. 1 is of longitudinal cross-sectional views showing an optical member according to a preferred embodiment of the present invention, and FIGS. 2 to 6 are longitudinal cross-sectional views showing an optical member according to the other preferred embodiments of the present invention. FIG. 10 is a cross-sectional view showing the light path when a prism sheet is disposed on the optical member according to the preferred embodiment of the present invention, and FIGS. 11 and 12 are longitudinal cross-sectional views showing the state in which the optical member according to the other preferred embodiments of the present invention is disposed on light sources. In FIGS. 1 to 4, (A) illustrates the optical member manufactured through co-extrusion, and (B) illustrates the optical member obtained by applying a curable resin on one surface of a substrate layer and then curing it, and the specific description thereof is given below. Throughout the drawings, the same reference numerals refer to similar elements for convenience, but this does not mean that they are the same as each other in terms of the composition and the form.

According to the present invention, the optical member includes a substrate layer 10 and a structural layer 20 formed on one surface thereof.

More specifically, in the optical member according to the present invention, the structure layer 20 has a plurality of 3D structures. When viewed in longitudinal cross-section, each of the 3D structures includes a first zone 2 having a predetermined curvature in both directions from the peak thereof, and two second zones 1 abutting on both sides of the first zone 2 and having an inclination angle relative to the substrate layer.

When viewed in longitudinal cross-section, the second zone 1 of the 3D structure includes a line of a predetermined inclination angle α relative to the substrate layer 10. The inclination angle α may fall in the range of 30~50° or 130~150°.

When viewed in longitudinal cross-section, the curvature of the first zone 2 of the 3D structure satisfies Equation 1 below in an x-axis and y-axis coordinate system wherein the peak is set to an origin of the system.

$$k = \frac{-2y}{x^2} \quad \text{Equation 1}$$

(wherein x is a real number other than 0, and y and k are real numbers).

Figure 6:
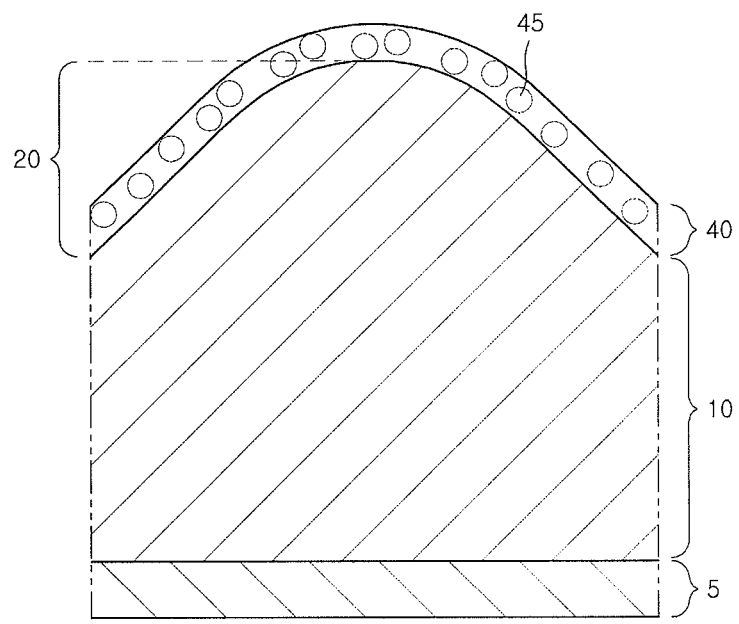
Figure 7:
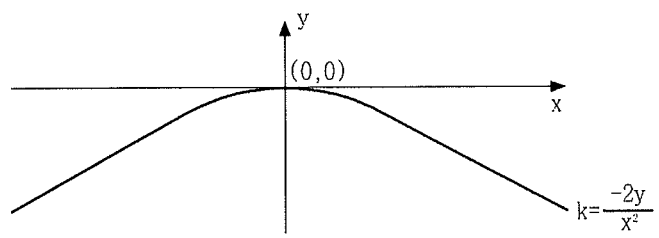
FIG. 7 is a graph showing the curvature of the first zone of the structural layer of the optical member according to the preferred embodiment of the present invention.

The graph showing the curvature of Equation 1 is illustrated in FIG. 6.

In the optical member according to the present invention, the curvature of the first zone 2, namely, k of Equation 1, may be 0.05~0.30.

Figure 8:
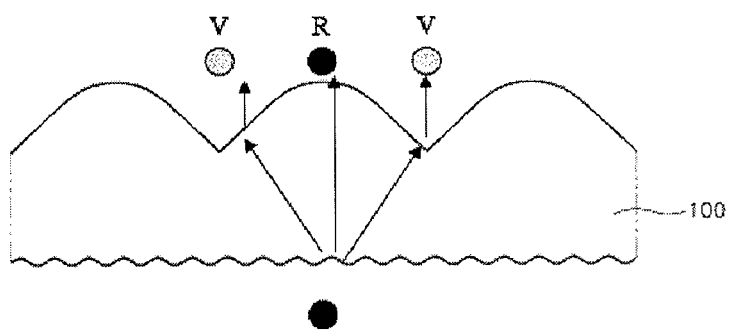
FIG. 8 is a view showing the principle in which a real image R and a virtual image V are generated through the optical member according to the preferred embodiment of the present invention.
Figure 9:
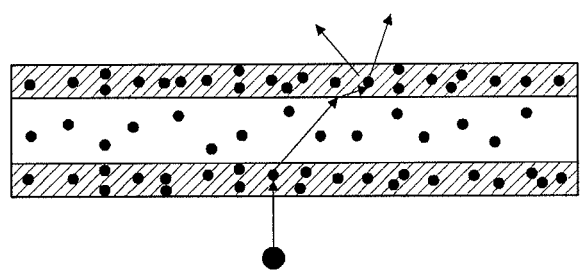
FIG. 9 is a view showing the principle in which light is diffused by a conventional light diffusion member.

The optical member according to the present invention is favorable in terms of hiding performance because of the first zone 2 having the above curvature and the two second zones 1. The reason is that the real image R and at least one virtual image V may be generated while passing incident light through the optical member. Specifically, the virtual image V, which indicates the sidelobe produced by a small peak generated at a light transmittance of about 5~15%, is caused by the superposition of the transmitted light rays. The principle in which the real image R and the virtual image V are generated is shown in FIG. 8. Compared to a conventional light diffusion member (FIG. 9) in which light is diffused by light-diffusing particles, the optical member according to the present invention may more efficiently and surely subdivide light. Thus, the real image R and at least one virtual image V may be generated through the optical member according to the present invention. Thereby, even when a specific light-diffusing material is not used, adequate hiding performance may be exhibited. Further, the optical member according to the present invention has a total light transmittance of 90% or more and a haze of 90% or more when having a thickness of 1.5 mm.

In the case where the optical member 100 according to the present invention is located between a diffusion member and a prism sheet 200, the curvature is adjusted to fall within the above range in consideration of the refractive index of light passed through the light guide plate or the diffusion member, whereby the generation of a sidelobe may be inhibited while correcting the light path so that light rays in the wider angular range are collected forwards. The sidelobe indicates the virtual image produced by the small peak caused when a light transmittance is about 5~15%, and is generated due to the superposition of the transmitted light rays.

The base length $a_2$ of the first zone 2 of the 3D structure of the structural layer in contact with the substrate layer 10 may be ⅓~⅗ of a pitch a. Thus, each of the two second zones 1 abutting on both sides of the first zone 2 preferably has a base length $a_1$ in contact with the substrate layer 10, amounting to ⅕~⅓ of the pitch a. If the base length $a_2$ of the first zone in contact with the substrate layer 10 exceeds ⅗ of the pitch a, the first zone 2 becomes wider so that the longitudinal cross-section thereof is similar to a semi-circular shape. Hence, because the major portion of the interface is a curved line, the light separation effect caused by the refraction of light is increased, whereas the light separation effect in which the virtual image is exactly divided in two by the oblique side of the second zone is reduced, consequently diminishing the net light separation effect. Further, reflection back increases in the 3D structure, and the major portion of the interface is a curved line and thus light is excessively refracted, undesirably resulting in non-uniform light collection. Meanwhile, if the base length $a_2$ of the first zone in contact with the substrate layer 10 is less than ⅓ of the pitch a, the first zone 2 is too short, so that the longitudinal cross-section thereof is similar to a triangular shape. Accordingly, the light separation effect in which the virtual image is exactly divided in two by the oblique side of the second zone is increased, whereas the light separation effect caused by the refraction of light is decreased, consequently reducing the net light separation effect. Further, only the incident light rays having a specific angle are collected, and the other light rays are lost due to the generation of sidelobes or reflection back, undesirably lowering the luminance.

The pitch a of the 3D structure of the structural layer 20 is not particularly limited but is preferably set to 100~500 μm. The height b of the 3D structure of the structural layer 20 is not particularly limited but is preferably set to 25~300 μm. Therefore, the 3D structure may be used to maximize the light source-hiding effect in consideration of the pattern shape of the 3D structure, eliminate a Moire phenomenon with a pattern sheet to be disposed thereon, minimize the loss of light in consideration of the refraction of light, and realize efficient light collection.

Each of the 3D structures of the structural layer 20 may have a shape in which the longitudinal cross-section thereof is symmetrical with respect to the vertical centerline passing through the peak point thereof. Specifically, it is desirable that the 3D structures of the structural layer 20 be shaped such that the longitudinal cross-section thereof is symmetrical over 360° with respect to the axis defined by an imaginary line formed by perpendicularly connecting the peak point of the 3D structure to the surface of the substrate layer or is symmetrical with respect to an imaginary plane defined between a line formed by connecting the peak points of the 3D structures and an imaginary line formed by perpendicularly projecting this line to the surface of the substrate layer. Alternatively, the longitudinal cross-section of the 3D structure, which is obtained in a manner such that the line formed by connecting the peak points of the 3D structures is perpendicularly projected to the surface of the substrate layer to form a first imaginary line, a second imaginary line on the surface of the substrate layer that is orthogonal to the first imaginary line and intersects the first imaginary line at the intersecting point is formed, and a plane defined between the second imaginary line and the peak point located directly above the intersecting point results as the longitudinal cross-section, may be symmetrical with respect to the vertical centerline passing through the peak point. However, the present invention is not limited thereto.

The optical member 100 according to the present invention may be manufactured through co-extrusion. Specifically, the optical member may be formed by co-extruding the molten base resin for the substrate layer 10 and the structural layer 20 while passing through a pattern roller. As shown in (A) of FIGS. 1 to 4, the substrate layer 10 and the structural layer 20 may be simply manufactured using one type of resin without discrimination between the layers. The thickness of the optical member including the substrate layer 10 and the structural layer 20 which are extruded may be 0.5~2.0 mm. The extrusion temperature may be set in the range of 200~300° C. depending on the type of base resin. The base resin may be a resin mixture of polycarbonate and polystyrene mixed at a weight ratio of 1:9~9:1, a polycarbonate resin, a polystyrene resin, an olefin resin, a polymethylmethacrylate resin or a styrene-acrylic copolymer resin. The polystyrene resin has heat resistance and thus a glass transition temperature of 110° C. or higher as measured by differential scanning calorimetry, and includes for example G9001 available from PS Japan. The olefin resin may include a cycloolefin polymer (COP) or a cycloolefin copolymer (COC).

On the other hand, as shown in (B) of FIGS. 1 to 4, the optical member according to the present invention, includes a substrate layer 10 and a structural layer 20 formed on one surface of the substrate layer 10 by applying a solution including a UV curable resin or a thermosetting resin thereon and then curing it.

The material for the substrate layer 10 includes a polyethyleneterephthalate resin, a polymethylmethacrylate resin, a polycarbonate resin, a polypropylene resin, a polyethylene resin, a polystyrene resin or a styrene-acrylic copolymer resin. The material for the structural layer includes a curable resin, for example, a light transmittable material. Any polymer resin including a UV curable resin or a thermosetting resin may be used without limitation, and examples thereof include unsaturated fatty acid esters, aromatic vinyl compounds, unsaturated fatty acids and derivatives thereof, unsaturated dibasic acids and derivatives thereof, and vinyl cyanide compounds such as methacrylonitrile. In consideration of the refractive index with the substrate layer 10, the type of polymer resin may be determined.

The thickness of the substrate layer 10 is set to 10~1000 μm, and preferably 15~400 μm, in order to realize superior mechanical strength, thermal stability and flexibility and prevent the loss of transmitted light.

Further, the substrate layer 10 may include irregularities. In this case, when the surface of the substrate layer on which light is incident includes irregularities, hiding performance becomes good. The process for forming the irregularities is not particularly limited. In the case where the optical member is manufactured through co-extrusion, the irregularities may be formed using an embossing pattern roller as the roller for forming the substrate layer 10. When the substrate layer includes irregularities, the surface roughness Ra thereof may be 2~40 μm. Also, the process for forming the irregularities is not particularly limited, but includes the addition of light-diffusing particles to the substrate layer 10. The particles preferably have a diameter of 1~50 μm, and are used in an amount of 1~40 parts by weight based on 100 parts by weight of the binder resin. When the light-diffusing particles having the above diameter are used in the above amount, white turbidity and separation of the particles are prevented, and light diffusion effects adequate for improving light source-hiding performance without any influence on the light path of the structural layer can be realized.

The light-diffusing particles include various organic or inorganic particles. Examples of the organic particles include acrylic particles including homopolymers or copolymers of methyl methacrylate, acrylic acid, methacrylic acid, hydroxyethyl methacrylate, hydroxypropyl methacrylate, acrylamide, methylolacrylamide, glycidyl methacrylate, ethyl acrylate, isobutyl acrylate, n-butyl acrylate and 2-ethylhexyl acrylate, olefin particles including polyethylene, polystyrene and polypropylene, acryl-olefin copolymer particles, multilayer multicomponent particles prepared by forming a layer of homopolymer particles and then forming a layer of another type of monomer thereon, siloxane polymer particles and tetrafluoroethylene particles, and examples of the inorganic particles include silicon oxide, aluminum oxide, titanium oxide, zirconium oxide and magnesium fluoride. Such organic and inorganic particles are merely illustrative, are not limited to the examples listed above, and may be replaced with other known materials as long as the main purpose of the present invention is achieved, as will be apparent to those skilled in that art. The case in which the type of material is changed also falls within the technical scope of the present invention.

In the case where the structural layer 20 is formed only on one surface of the substrate layer 10, the optical member according to the present invention may further include a bottom layer 30 on the surface of the substrate layer opposite the surface having the structural layer 20.

The bottom layer 30 may be formed through co-extrusion or by applying a polymer resin on the corresponding surface of the substrate layer 10 and then curing it. As such, particles 35 may be dispersed in the polymer resin.

In the case where the bottom layer 30 is formed through co-extrusion of the molten base resin, the detailed process and the type of resin are the same as in the co-extrusion of the substrate layer 10 and the structural layer 20.

In the case where the bottom layer 30 is formed through curing, a binder resin therefor includes a resin that adheres well to the substrate layer 10 and has good compatibility with the particles 35 dispersed therein, for example, a resin in which the particles 35 are uniformly dispersed so that they are not separated or precipitated. Specific examples of the resin include acrylic resin including homopolymers, copolymers, or terpolymers of unsaturated polyester, methyl methacrylate, ethyl methacrylate, isobutyl methacrylate, n-butyl methacrylate, n-butylmethyl methacrylate, acrylic acid, methacrylic acid, hydroxyethyl methacrylate, hydroxypropyl methacrylate, hydroxyethyl acrylate, acrylamide, methylolacrylamide, glycidyl methacrylate, ethyl acrylate, isobutyl acrylate, n-butyl acrylate and 2-ethylhexyl acrylate, urethane resin, epoxy resin, and melamine resin.

In the bottom layer 30, the light-diffusing particles 35 may be contained in an amount of 0.01~40 parts by weight based on 100 parts by weight of the binder resin or the base resin.

The surface of the bottom layer 30 may have irregularities. The process for forming the irregularities is not particularly limited, but irregularities may be formed by adding the particles 35 to the bottom layer 30, or alternatively, may be formed using an embossing pattern roller upon extrusion. When the bottom layer 30 has irregularities, the surface roughness Ra thereof may be 2~40 μm. In this case, in the bottom layer 30, the particles 35 are contained in an amount of 1~40 parts by weight based on 100 parts by weight of the binder resin or the base resin.

The amount of the particles is set taking into consideration damage prevention effects, light diffusion and front-surface luminance in so far as the use efficiency of light is not reduced.

The particles 35 of the bottom layer 30 may include organic or inorganic particles mentioned as the light-diffusing particles, and may be the same as or different from the light-diffusing particles which may be contained in the substrate layer 10.

The bottom layer 30 includes surface protrusions functioning to reduce the contact area with the facing surface in the process device, with another optical film or with a light source guide pin, which is disposed thereon, during the loading or storage of optical film or the assembly of the optical films with other parts, thereby preventing damage to the surface from occurring as a result of separation into respective films, their transport or assembly. The thickness of the bottom layer 30 is not particularly limited, but may be set to 10~300 μm.

Figure 5:
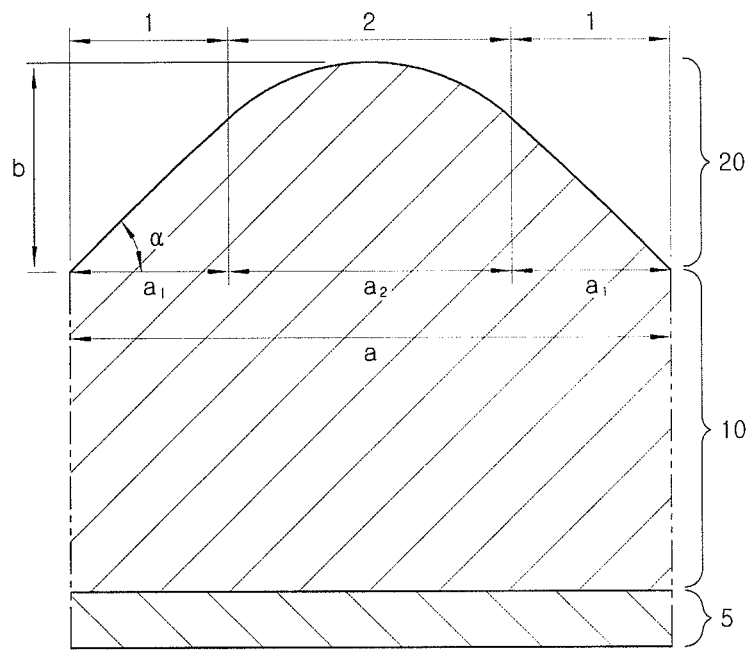

Also, in the case where the structural layer 20 is formed on one surface of the substrate layer 10, as shown in FIGS. 5 and 6, the optical member 100 according to the present invention may further include a slip layer 5 on the surface of the substrate layer opposite the surface having the structural layer 20. The slip layer 5 is preferably formed on the surface in contact with support pins 60 for holding the optical member 100, and may have a surface friction coefficient of 0.25 or less to minimize friction with the support pins 60. Thereby, even when the optical member 100 expands and shrinks because of heat, it is not scratched or does not generate noise attributable to the pulling of support pins at a portion in contact with the support pins 60.

The optical member according to the present invention may have a hole having a depth of 15 μm or less after a vibration test as measured by the following process. Thus, even though the change in temperature occurs depending on the change in state of the light sources 50, the optical member 100 may minimize the generation of scratches or noise upon expansion and shrinkage thereof.

Measurement of Hole Depth after Vibration Test

The depth of the hole formed in the optical member according to the present invention after a vibration test is measured by mounting the optical member to a BLU (LC420WUF) for an LCD panel, fixing the optical member to a vibration tester (WSVT-4000 available from WANGSAN ENGINEERING), performing the vibration test under conditions of 10 min at 10 Hz and 20 min at 60 Hz thus forming the hole in the lower surface of the optical member at a position which is identical to that of the support pin located at the center of the BLU, measuring the height deviation Z between the highest portion of the hole and the lowest portion of the hole using a laser scanning microscope (LSM 5 Pascal, available from CARL ZEISS), performing the measurement three times at the above position, and determining the average value of three measurements.

The slip layer 5 having the above friction coefficient may include a component having a surface friction coefficient of 0.25 or less, for example, a resin selected from among a fluorine resin, a styrene-butadiene copolymer, wax and rubber. Alternatively useful is a mixture of styrene-butadiene copolymer resin and one or more selected from among fluorine resin particles, styrene-butadiene copolymer particles, wax particles and rubber particles.

The slip layer 5 may be formed in a manner such that the substrate layer 10 is formed and then the resin for the slip layer 5 is applied thereon, or that the resin for the slip layer 5 may be co-extruded upon extrusion of the substrate layer 10 or the substrate layer 10 and the structural layer 20. On the bottom layer 30 or a top layer 40, the slip layer 5 may be formed through the process as mentioned above.

The thickness of the slip layer 5 may be set to 1~300 μm in order to be stable to noise generated by the friction with the support pins 60 because of the repeated expansion and shrinkage of a diffusion plate or consequent to the vibration test for the evaluation of reliability.

Also, the optical member according to the present invention may further include the top layer 40 formed on the surface of the structural layer 20 opposite the surface having the substrate layer 10, and the top layer 40 may have particles 45.

The top layer 40 may be formed in the same manner as the process of forming the slip layer 5 or the bottom layer 30, and contains light-diffusing particles in an amount of 0.01~40 parts by weight based on 100 parts by weight of the binder resin or the base resin in consideration of light diffusion, hiding performance, and front-surface luminance so long as the use efficiency of light is not reduced. The thickness of the top layer 40 is not particularly limited, but may be set to 10~300 μm.

The optical member according to the present invention may include neither the bottom layer 30 nor the top layer 40, or may selectively include the bottom layer 30, the slip layer 5 or the top layer 40. Alternatively, both the bottom layer 30 and the top layer 40 or both the slip layer 5 and the top layer 40 may be included. Alternatively, the slip layer 5 may be formed on the bottom layer 30, and the top layer 40 may be selectively included.

One or both surfaces of the optical member according to the present invention may be subjected to antistatic treatment. To this end, useful is an antistatic agent including polyetheramide, polyetherimideamide or polyetheresteramide, a cationic antistatic agent, such as an ammonium, phosphonium or sulfonium salt having a long chain alkyl radical, or an anionic antistatic agent, such as sodium alkylsulfate. Alternatively, the optical member may be coated with a surfactant type antistatic component through spraying.

Also, the optical member according to the present invention has a Weber Fraction of 1.0 or less as represented by Equation 2 below. If so, a stable image may be provided upon image evaluation.

$$\text{Weber Fraction (\%)} = \frac{Lumi \cdot (\max) - Lumi \cdot (\min)}{Lumi \cdot (\max)} \times 100 \quad \text{Equation 2}$$

(wherein Lumi. is luminance)

The present invention provides a BLU assembly including the optical member as above and one or more selected from among a light diffusion film, a prism film and a protective film, each of which may be used in the singular or in the plural. Thereby, compared to the case where only the optical member is mounted, the case where the combinations of the above films are used may exhibit superior light source-hiding performance and appropriate luminance.

FIG. 10 shows the light path when the prism sheet 200 is disposed on the optical member 100 according to the preferred embodiment of the present invention. While light passed through the light guide plate or the diffusion plate goes through the optical member 100 according to the present invention, the path thereof is corrected, and thus much more light rays may travel forwards because of the prism sheet 200. Specifically, even the light rays that enter into the optical member at an angular range of about 70° with respect to the desired light travelling direction may be collected forwards.

Thus, the present invention provides a BLU assembly including the optical member according to the present invention and the prism sheet formed on either surface of the optical member or the light diffusion plate formed on either surface of the optical member. Also, a BLU assembly may include the optical member, the light diffusion plate formed on one surface of the optical member, and the prism sheet formed on the other surface of the optical member.

As shown in FIGS. 11 and 12, the BLU assembly according to the present invention may include light sources 50 and the optical member 100 disposed adjacent thereto. The distance d between the light source 50 and the optical member 100 may be 2~10 mm, which is remarkably decreased compared to a conventional BLU assembly in which the distance between the light source and the optical member is 13~17 mm. Nevertheless, the BLU assembly according to the present invention may exhibit hiding performance equal to or greater than the conventional BLU assembly. Further, when the distance therebetween is shortened, even if many portions of the optical member 100 are exposed to heat, the deformation thereof does not result easily. Also, even when the optical member expands and shrinks due to changes in temperature, it is not scratched nor does it generate noise attributable to the pulling of the support pins at the portion in contact with the support pins 60.

A better understanding of the present invention may be obtained through the following examples, which are set forth to illustrate but are not to be construed as limiting the present invention.

Example 1

Polycarbonate resin pellets were co-extruded at 250° C. using a single screw extruder having diameters of 135 mm and 60 mm while passing through a pattern roller thus forming a substrate layer 1.0 mm thick and a structural layer 20 having a linear array of unit structures each including a pitch of 200 μm, a height b of 60 μm, an inclination angle α of 43°, a curvature k of 0.15, a base length $a_1$ of 50 μm of each of two second zones 1 in contact with the substrate layer 10 and a base length $a_2$ of 100 μm of a first zone 2 in contact with the substrate layer 10, as shown in (A) of FIG. 1, thereby completing an optical member.

Example 2

An optical member was manufactured in the same manner as in Example 1, with the exception that the structural layer was formed to have unit structures each including the pitch of 300 μm, the height b of 130 μm, the inclination angle α of 40°, the curvature k of 0.21, the base length $a_1$ of 75 μm of the second zone 1 in contact with the substrate layer 10, and the base length $a_2$ of 150 μm of the first zone 2 in contact with the substrate layer 10.

Example 3

An optical member was manufactured in the same manner as in Example 1, with the exception that, as the base resin for the substrate layer and the structural layer, a resin mixture of polycarbonate resin pellets and polystyrene resin pellets at a weight ratio of 1:1 was melt extruded.

Example 4

An optical member was manufactured in the same manner as in Example 1, with the exception that, as the base resin for the substrate layer and the structural layer, a methylmethacrylate resin was used.

Example 5

A methacrylate resin was applied on a metal mold enabling the formation of a structural layer having a linear array of unit structures as shown in (B) of FIG. 1, laminated with a polyethyleneterephthalate (PET) film (LM170E01 available from HEESUNG ELECTRONICS), and irradiated with UV radiation at 120 watts for 3 sec and thus cured, after which the cured product was released from the metal mold, thus manufacturing an optical member. Each of the unit structures of the structural layer had the pitch of 200 μm, the height b of 60 μm, the inclination angle α of 43°, the curvature k of 0.15, the base length $a_1$ of 50 μm of the second zone 1 in contact with the substrate layer 10, and the base length $a_2$ of 100 μm of the first zone 2 in contact with the substrate layer 10.

Example 6

As in Example 1, a bottom layer composed of, as a base resin, polycarbonate resin pellets and 1.2 parts by weight of methylmethacrylate particles (average diameter of 2 μm) based on 100 parts by weight of the base resin was co-extruded along with the substrate layer and the structural layer so as to be formed to a thickness of 30 μm on a surface of the substrate layer opposite the surface having the structural layer, thus manufacturing an optical member.

Example 7

As in Example 1, a bottom layer composed of, as a binder resin, a methylmethacrylate resin and 1.2 parts by weight of silicone resin particles (average diameter of 2 μm) based on 100 parts by weight of the binder resin was applied to a thickness of 30 μm on a surface of the substrate layer opposite the surface having the structural layer, and irradiated with UV radiation at 120 watts for 3 sec and thus cured, thus manufacturing an optical member.

Comparative Example 1

An optical member was manufactured in the same manner as in Example 1, with the exception that the structural layer was formed to have a linear array of hemispherical structures having a longitudinal cross-section which was semi-circular in shape, and a pitch of 200 μm and a height b of 150 μm.

Comparative Example 2

An optical member was manufactured in the same manner as in Example 1, with the exception that the structural layer was formed to have a linear array of triangular prisms having a longitudinal cross-section which was triangular in shape, and a pitch of 200 μm, a height b of 150 μm and an inclination angle α of 45°.

The optical member of the examples and the comparative examples was disposed on a light diffusion plate (DP350 available from KOLON, thickness: 1.50 mm, transmittance: 57.0%, haze: 99%), and a prism sheet (LC213 available from KOLON, thickness: 188 μm, pitch: 50 μm, height: 25 μm, inclination angle: 45°) was disposed on the optical member. The properties of the assembly thus obtained were measured. The results are shown in Table 1 below.

As a control, on a light diffusion sheet (LD214 available from KOLON, thickness: 188 μm, transmittance: 75.0%, haze: 96.1%) as a replacement for the optical member of the examples and the comparative examples, a prism sheet (LC213 available from KOLON, thickness: 188 μm, pitch: 50 μm, height: 25 μm, inclination angle: 45°) was disposed. The properties of the assembly thus obtained were measured.

(1) Luminance

The optical member of the examples and the comparative examples was mounted to a BLU for a 17" LCD panel as mentioned above, and the luminance values of 13 random points were measured using a luminance meter (BM-7, available from TOPCON, Japan) and averaged. The luminance value was represented by an increment relative to the control.

(2) Collectable Incident Angle

The optical member was mounted to a BLU for a 17" LCD panel as mentioned above and fixed to a device with a rotator for measuring a viewing angle. Using PR880 available from PRITCHARD, the collectable incident angle for collecting the light of the light source incident on the prism sheet so as to be emitted at a forward angle of 0°, namely, the traveling angle of light going through the sheet disposed at the immediate rear of the prism sheet was measured.

(3) Sidelobe

The optical member was mounted to a BLU for a 17" LCD panel as mentioned above and fixed to a device with a rotator for measuring a viewing angle. Using PR880 available from PRITCHARD, whether the sidelobe was generated in the range of viewing angle±90° in all directions was observed.

○: sidelobe was not generated.

x: sidelobe was generated.

TABLE 1

| | Evaluation of Luminance | Incident Angle | Sidelobe |
| --- | --- | --- | --- |
| Ex. 1 | 30% | ±80 | ○ |
| Ex. 2 | 29% | ±80 | ○ |
| Ex. 3 | 30% | ±80 | ○ |
| Ex. 4 | 30% | ±80 | ○ |
| Ex. 5 | 33% | ±80 | ○ |
| Ex. 6 | 19% | ±75 | ○ |
| Ex. 7 | 16% | ±70 | ○ |
| C. Ex. 1 | −14% | ±70 | ○ |
| C. Ex. 2 | 11% | ±70 | X |
| Control | 0% | ±55 | ○ |

As is apparent from the results of evaluation of the properties, when the optical member according to the present invention was located between the light diffusion plate and the prism sheet, the increment of luminance was higher compared to when using a conventional light diffusion film. Also, the angular range in which light was collectable forwards by the prism sheet became wider. When the optical member according to the present invention was used, the sidelobe was not generated, and thus the loss of light due to the reflection back of light was minimized.

Therefore, when the optical member according to the present invention was used, it could be seen that the light path was corrected so that light in the wider angular range was collected forwards, and luminance was increased.

Example 8

Polystyrene resin pellets were co-extruded at 220° C. using a single screw extruder having diameters of 135 mm and 60 mm while passing through a pattern roller thus forming a structural layer 20 having a linear array of unit structures each including a pitch of 300 μm, a height b of 130 μm, an inclination angle α of 40°, a curvature k of 0.21, a base length $a_1$ of 75 μm of each of two second zones 1 in contact with the substrate layer 10 and a base length $a_2$ of 150 μm of a first zone 2 in contact with the substrate layer 10, as shown in (A) of FIG. 1, so that the total thickness of the optical member was 1.5 mm, thereby completing an optical member.

Example 9

An optical member was manufactured in the same manner as in Example 8, with the exception that the structural layer was formed to have unit structures each including the pitch of 200 μm, the height b of 60 μm, the inclination angle α of 43°, the curvature k of 0.15, the base length $a_1$ of 50 μm of the second zone 1 in contact with the substrate layer 10 and the base length $a_2$ of 100 μm of the first zone 2 in contact with the substrate layer 10.

Example 10

An optical member was manufactured in the same manner as in Example 8, with the exception that polycarbonate resin pellets were used as the base resin for the substrate layer and the structural layer.

Example 11

An optical member was manufactured in the same manner as in Example 8, with the exception that a styrene-acrylic copolymer resin was used as the base resin for the substrate layer and the structural layer.

Example 12

A methacrylate resin was applied on a metal mold enabling the formation of a structural layer having a linear array of unit structures as shown in (B) of FIG. 1, laminated with a PET film (LM170E01 available from HEESUNG ELECTRONICS), and irradiated with UV radiation at 120 watts for 3 sec and thus cured, after which the cured product was released from the metal mold, thus manufacturing an optical member. Each of the unit structures of the structural layer had the pitch of 300 μm, the height b of 130 μm, the inclination angle α of 40°, the curvature k of 0.21, the base length $a_1$ of 75 μm of the second zone 1 in contact with the substrate layer 10, and the base length $a_2$ of 150 μm of the first zone 2 in contact with the substrate layer 10.

Example 13

As in Example 8, a bottom layer composed of, as a base resin, polycarbonate resin pellets and 1.2 parts by weight of methylmethacrylate particles (average diameter of 2 μm) based on 100 parts by weight of the base resin was co-extruded along with the substrate layer and the structural layer so as to be formed to a thickness of 30 μm on a surface of the substrate layer opposite the surface having the structural layer, thus manufacturing an optical member. The surface roughness Ra of the bottom layer was 10 μm.

Example 14

As in Example 8, a bottom layer composed of, as a binder resin, a methylmethacrylate resin and 1.2 parts by weight of silicone resin particles (average diameter of 2 μm) based on 100 parts by weight of the binder resin was applied to a thickness of 30 μm on a surface of the substrate layer opposite the surface having the structural layer, and irradiated with UV radiation at 120 watts for 3 sec and thus cured, thereby manufacturing an optical member. The surface roughness Ra of the bottom layer was 10 μm.

Comparative Example 3

An optical member was manufactured in the same manner as in Example 8, with the exception that the structural layer was formed to have a linear array of hemispherical structures having a longitudinal cross-section which was semi-circular in shape, and a pitch of 200 μm and a height b of 150 μm.

Comparative Example 4

An optical member was manufactured in the same manner as in Example 8, with the exception that the structural layer was formed to have a linear array of triangular prism structures having a longitudinal cross-section which was triangular in shape, and a pitch of 300 μm, a height b of 150 μm and an inclination angle α of 45°.

Comparative Example 5

A light diffusion plate (DP421 available from KOLON, thickness: 1.50 mm, transmittance: 57.0%, haze: 99%) was prepared.

Comparative Example 6

A prism sheet (LC213 available from KOLON, thickness: 188 μm, pitch: 50 μm, height: 25 μm, inclination angle: 45°) was disposed on a light diffusion sheet (LD613 available from KOLON, thickness: 188 μm, transmittance: 75.5%, haze: 96.0%).

The properties of the optical member of the examples and the comparative examples were measured as below. The results are shown in Table 2 below.

(4) Heat Resistance

The optical member of the examples and the comparative examples was cut to a size of 42 inches, fixed to a thermohydrostat in a state in which the optical member was erected in a longitudinal direction, and then allowed to stand under conditions of 50° C., 80% RH and 500 hours. Before and after the test, the distance between four corners of the optical member, which were warped upwards, and the surface table was measured using a gap gauge. The average warpage value of the four corners was determined. As the warpage and the change in warpage before and after the test were decreased, heat resistance was evaluated to be higher.

(5) Weber Fraction (Hiding Performance)

The optical member of the examples and the comparative examples was mounted to a BLU (LC420WUF) for a 42" LCD panel so that it was spaced apart from the light sources by a distance of 4.0 mm. The luminance thereof was measured using a 2D color analyzer (CA-2000, available from MINOLTA), and a Weber fraction was calculated using Equation 2 below. As the calculated Weber fraction was lower, light could be uniformly diffused, resulting in superior hiding performance.

$$\text{Weber Fraction (\%)} = \frac{Lumi\cdot(\max) - Lumi\cdot(\min)}{Lumi\cdot(\max)} \times 100 \quad \text{Equation 2}$$

(wherein Lumi. is luminance)

(6) Total Light Transmittance

The optical member of the examples and the comparative examples was cut to a size of 6 cm×6 cm and the total light transmittance thereof was measured using a haze meter (NDH-2000, available from NIPPON DENSHOKU).

The sample was measured in a state in which the structural layer was located in a longitudinal direction on the surface of light sources. The measurement system was used after having been preheated for 30 min.

(7) Haze

The optical member of the examples and the comparative examples was cut to a size of 6 cm×6 cm and the haze thereof was measured using a haze meter (NDH-2000, available from NIPPON DENSHOKU).

The sample was measured in a state in which the structural layer was located in a longitudinal direction on the surface of light sources. The measurement system was used after having been preheated for 30 min.

(8) Luminance

The optical member of the examples and the comparative examples was mounted to a BLU (LC420WUF) for a 42" LCD panel so that it was spaced apart from the light sources by a distance of 4.0 mm. The luminance values of 13 random points thereof were measured using a luminance meter (BM-7, available from TOPCON) and averaged.

(9) Surface Roughness Ra

The surface roughness was measured using a laser scanning microscope (LSM 5 Pascal, available from CARL ZEISS). The highest portion and the lowest portion of the irregularities were measured, thus determining the surface roughness Ra. The measurement was performed three times at the same position and the average value of three measurements was determined.

TABLE 2

| | Heat Resistance (mm) | Weber Fraction (%) | Total Light Transmittance (%) | Haze (%) | Luminance (cd/m²) |
|---|---|---|---|---|---|
| Ex. 8 | 0.10 | 0.80 | 91.4 | 90.4 | 9543 |
| Ex. 9 | 0.11 | 0.85 | 91.4 | 90.5 | 9439 |
| Ex. 10 | 0.08 | 0.80 | 91.1 | 90.3 | 9527 |
| Ex. 11 | 0.15 | 0.80 | 91.2 | 90.5 | 9542 |
| Ex. 12 | 0.18 | 0.80 | 91.5 | 90.4 | 9345 |
| Ex. 13 | 0.13 | 0.78 | 90.2 | 91.4 | 9642 |
| Ex. 14 | 0.12 | 0.78 | 90.3 | 91.2 | 9651 |
| C. Ex. 3 | 0.11 | 1.21 | 90.1 | 91.2 | 8543 |
| C. Ex. 4 | 0.11 | 1.17 | 75.4 | 80.4 | 8795 |
| C. Ex. 5 | 0.10 | 1.33 | 57.0 | 98.9 | 6948 |
| C. Ex. 6 | 0.27 | 1.42 | 70.4 | 98.2 | 7541 |

Example 15

Polystyrene resin pellets were co-extruded at 220° C. using a single screw extruder having diameters of 135 mm and 60 mm while passing through a pattern roller thus forming a structural layer 20 having a linear array of unit structures each including a pitch of 300 µm, a height b of 130 µm, an inclination angle α of 40°, a curvature k of 0.21, a base length $a_1$ of 75 µm of each of two second zones 1 in contact with the substrate layer 10 and a base length $a_2$ of 150 µm of a first zone 2 in contact with the substrate layer 10, as shown in FIG. 5, so that the total thickness of the optical member was 1.5 mm.

A slip layer was formed to a thickness of 50 µm on the other surface of the substrate layer through co-extrusion using a styrene-butadiene copolymer resin, thereby completing an optical member.

Example 16

An optical member was manufactured in the same manner as in Example 15, with the exception that the slip layer was formed through co-extrusion using a polyvinylidene fluoride resin.

Example 17

An optical member was manufactured in the same manner as in Example 15, with the exception that the structural layer was not formed.

Example 18

A methacrylate resin was applied on a metal mold enabling the formation of a structural layer having a linear array of unit structures as shown in FIG. 6, laminated with a PET film (LM170E01, available from HEESUNG ELECTRONICS), and irradiated with UV radiation at 120 watts for 3 sec and thus cured, after which the cured product was released from the metal mold, thus manufacturing an optical member. Each of the unit structures of the structural layer had the pitch of 300 µm, the height b of 130 µm, the inclination angle α of 40°, the curvature k of 0.21, the base length $a_1$ of 75 µm of the second zone 1 in contact with the substrate layer 10, and the base length $a_2$ of 150 µm of the first zone 2 in contact with the substrate layer 10.

A slip layer was formed to a thickness of 50 µm on the other surface of the substrate layer through co-extrusion using a styrene-butadiene copolymer resin, thereby completing an optical member.

Comparative Example 7

An optical member was manufactured in the same manner as in Example 15, with the exception that the slip layer was not formed.

Comparative Example 8

A light diffusion plate (DP421 available from KOLON, thickness: 1.50 mm, transmittance: 57.0%, haze: 99%) was prepared.

Comparative Example 9

A prism sheet (LC213 available from KOLON, thickness: 188 µm, pitch: 50 µm, height: 25 µm, inclination angle: 45°)

was disposed on a light diffusion sheet (LD613 available from KOLON, thickness: 188 μm, transmittance: 75.5%, haze: 96.0%).

The properties of the optical member of the examples and the comparative examples were measured through the methods as below. The results are shown in Table 3 below.

(10) Surface Friction Coefficient

The surface friction coefficient μ was determined by measuring a maximum static coefficient using a friction coefficient meter (LF Plus, available from AMETEK). According to ASTM D 1894, the optical member was placed on a base substrate of a testing machine and then mounted to the rear surface of a sled (weight: 279 gf, size: 63.0 mm×68.0 mm), after which measurement was performed. The base substrate was moved at a speed of 250 mm/min and by a distance of 150 mm.

(11) Measurement of Hole Depth after Vibration Test

The optical member was mounted to a BLU (LC420WUF) for a 42" LCD panel and fixed to a vibration tester (WSVT-4000 available from WANGSAN ENGINEERING), after which the vibration test was performed under conditions of 10 min at 10 Hz and 20 min at 60 Hz.

After the vibration test, the depth of the hole formed in the lower surface of the optical member at the same position as the support pin located at the center of the BLU was measured using a laser scanning microscope (LSM 5 Pascal, available from CARL ZEISS). The height deviation Z between the highest portion and the lowest portion of the hole was determined, the measurement was performed three times at the same position, and the average value of three measurements was determined.

The luminance, the heat resistance, and the Weber fraction (hiding performance) were measured through the methods as in Examples 8 to 14 and Comparative Examples 3 to 6.

TABLE 3

| | Surface Friction Coefficient (μ) | Hole Depth (z, μm) | Luminance (cd/m$^2$) | Heat Resistance (mm) | Weber Fraction (%) |
|---|---|---|---|---|---|
| Ex. 15 | 0.22 | 4.29 | 9543 | 0.10 | 0.80 |
| Ex. 16 | 0.24 | 4.54 | 9439 | 0.11 | 0.85 |
| Ex. 17 | 0.22 | 4.31 | 6848 | 0.11 | 1.72 |
| Ex. 18 | 0.22 | 4.26 | 9345 | 0.15 | 0.82 |
| C. Ex. 7 | 0.35 | 35.81 | 9545 | 0.10 | 0.80 |
| C. Ex. 8 | 0.30 | 6.45 | 6948 | 0.10 | 1.33 |
| C. Ex. 9 | 0.38 | 18.33 | 7541 | — | 1.42 |

The invention claimed is:

1. An optical member, comprising a substrate layer and a structural layer formed on one surface or both surfaces of the substrate layer and having an array of a plurality of repeated, curved three-dimensional structures, wherein each of the curved three-dimensional structures of the structural layer has a height that is a peak of the curved three-dimensional structure and a distance that is a pitch of the repeated three-dimensional structures, and each of the curved three-dimensional structure is comprised of, when viewed in longitudinal cross-section, a center first zone having a predetermined curvature k in both directions from a peak thereof, as represented by Equation 1 below in an x-axis and y-axis coordinate system in which the peak is set to an origin of the system, and two second zones abutting on both sides of the first zone and having an inclination angle relative to the substrate layer:

$$k = \frac{-2y}{x^2}$$ Equation 1

(wherein x is a real number other than 0, and y and k are real numbers);

the first zone has a curvature k of 0.05-0.30;

each of the second zones has an inclination angle of 30-50° or 130-150° relative to the substrate layer;

the pitch of each of the three-dimensional structures, which is defined as the distance of the individual three-dimensional structure in contact with the substrate layer and is a sum of the distance of the first zone in contact with the substrate layer and the distances of the second zones in contact with the substrate layer, is 100-500 μm and the height of each of the three-dimensional structures is 25-300 μm; and the distance of the first zone in contact with the substrate layer is ⅓-⅗ of the pitch.

2. The optical member according to claim 1, wherein each of the three-dimensional structures of the structural layer has a longitudinal cross-section which is symmetrical with respect to a vertical centerline passing through a peak point thereof.

3. The optical member according to claim 1, wherein the substrate layer has irregularities and a surface roughness Ra of 2~40 μm.

4. The optical member according to claim 1, wherein, when the structural layer is formed on one surface of the substrate layer, the optical member further comprises one or more selected from the group consisting of:

a bottom layer formed on a surface of the substrate layer opposite the surface having the structural layer; and a top layer formed on a surface of the structural layer opposite the surface having the substrate layer.

5. The optical member according to claim 4, wherein the one or more selected from the bottom layer and the top layer have irregularities and a surface roughness Ra of 2~40 μm.

6. The optical member according to claim 4, wherein the one or more selected from the bottom layer and the top layer have a thickness of 10~300 μm.

7. The optical member according to claim 4, wherein the one or more selected from the bottom layer and the top layer include particles which are used in an amount of 0.01~40 parts by weight based on 100 parts by weight of a resin for the bottom layer or the top layer.

8. The optical member according to claim 1, further comprising a slip layer formed on one or more surfaces selected from the group consisting of an uppermost surface of the optical member and a lowermost surface of the optical member, and having a surface friction coefficient of 0.25 or less and a thickness of 1~300 μm.

9. The optical member according to claim 8, wherein the optical member has a hole having a depth of 15 μm or less after a vibration test, in which the depth of the hole is measured by mounting the optical member to a backlight unit for a liquid crystal display panel, fixing the optical member to a vibration tester, performing the vibration test under conditions of 10 min at 10 Hz and 20 min at 60 Hz thus forming the hole in a lower surface of the optical member at a position which is identical to that of a support pin located at a center of the backlight unit, measuring a height deviation Z between a highest portion of the hole and a lowest portion of the hole using a laser scanning microscope, performing the measurement three times at the above position, and determining an average value of three measurements.

10. The optical member according to claim 8, wherein the substrate layer, the structural layer and the slip layer are formed by co-extruding a base resin for the substrate layer and the structural layer and a resin for the slip layer while passing through a pattern roller.

11. The optical member according to claim 10, wherein the base resin is selected from among a resin mixture of polycarbonate and polystyrene mixed at a weight ratio of 1:9-9:1, a polycarbonate resin, a polystyrene resin, a methylmethacrylate resin, a styrene-acrylic copolymer resin, and an olefin resin.

12. The optical member according to claim 8, wherein a resin for the slip layer is selected from among a fluorine resin, a styrene-butadiene copolymer, wax and rubber.

13. The optical member according to claim 8, wherein a resin for the slip layer is a styrene-butadiene copolymer and comprises one or more selected from among fluorine resin particles, styrene-butadiene copolymer particles, wax particles and rubber particles.

14. The optical member according to claim 1, wherein the substrate layer and the structural layer are formed by co-extruding a base resin for the substrate layer and the structural layer while passing through a pattern roller.

15. The optical member according to claim 14, wherein the base resin is selected from among a resin mixture of polycarbonate and polystyrene mixed at a weight ratio of 1:9-9:1, a polycarbonate resin, a polystyrene resin, a methylmethacrylate resin, a styrene-acrylic copolymer resin, and an olefin resin.

16. The optical member according to claim 1, wherein the substrate layer is formed of any material selected from among a polyethyleneterephthalate resin, a polymethylmethacrylate resin, a polycarbonate resin, a polypropylene resin, a polyethylene resin, a polystyrene resin and a styrene-acrylic copolymer resin, and
the structural layer is formed of any material selected from among a polymer resin group including a UV curable resin and a thermosetting resin.

17. The optical member according to claim 1, wherein the optical member is subjected to antistatic treatment.

18. The optical member according to claim 1, wherein the optical member has a total light transmittance of 90% or more and a haze of 90% or more.

19. The optical member according to claim 1, wherein the optical member has a Weber fraction of 1.0 or less, as represented by Equation 2 below:

$$\text{Weber Fraction } (\%) = \frac{Lumi.(\max) - Lumi.(\min)}{Lumi.(\max)} \times 100 \quad \text{Equation 2}$$

(wherein Lumi. is luminance).

20. A backlight unit assembly, comprising:
the optical member of claim 1; and
at least one selected from among a prism sheet and a light diffusion plate.

21. The backlight unit assembly according to claim 20, wherein the optical member is spaced apart from a light source by a distance of 2-10 mm.

* * * * *